United States Patent [19]

Arthurs et al.

[11] Patent Number: 4,834,483

[45] Date of Patent: May 30, 1989

[54] FAST OPTICAL CROSS-CONNECT FOR PARALLEL PROCESSING COMPUTERS

[75] Inventors: Edward Arthurs, Summit; Matthew S. Goodman, Hillsborough Township, Somerset County; Haim Kobrinski, Byram Township, Sussex County; Mario P. Vecchi, Morris Plains Borough, Morris County, all of N.J.

[73] Assignee: Bell Communications Research, Inc., Livingston, N.J.

[21] Appl. No.: 46,912

[22] Filed: May 6, 1987

[51] Int. Cl.[4] .................. G02B 6/28; G06F 1/00; H04B 9/00; G02F 1/00

[52] U.S. Cl. .................. 350/96.16; 350/96.15; 350/96.20; 364/200; 370/1; 370/3; 455/606; 455/610; 455/612; 455/617

[58] Field of Search ............. 350/96.15, 96.16, 96.20; 364/200, 713; 365/234; 370/1, 3; 455/606, 609, 610, 612, 613, 617; 250/227

[56] References Cited

U.S. PATENT DOCUMENTS

| 4,027,153 | 5/1977 | Kach | 350/96.16 |
|---|---|---|---|
| 4,366,565 | 12/1982 | Herskowitz | 370/1 |
| 4,446,515 | 5/1984 | Sauer et al. | 350/96.16 |
| 4,484,262 | 11/1984 | Sullivan et al. | 364/200 |
| 4,511,207 | 4/1985 | Newton et al. | 350/96.15 |
| 4,516,204 | 5/1985 | Sauer et al. | 364/200 |
| 4,528,695 | 7/1985 | Khoe | 455/612 |
| 4,726,644 | 2/1988 | Mathis | 350/96.16 |
| 4,775,210 | 10/1988 | Fioretti | 350/96.16 |
| 4,781,427 | 11/1988 | Husbands et al. | 350/96.16 |
| 4,784,453 | 11/1988 | Shaw et al. | 350/96.16 |
| 4,787,693 | 11/1988 | Kogelnik et al. | 350/96.16 |

FOREIGN PATENT DOCUMENTS 3435827 4/1986 Fed. Rep. of Germany ...... 455/612

OTHER PUBLICATIONS

Tamura et al., "Optical Cascade Star Network . . . ", J. of Lightwave Tech., vol. LT-2, No. 1, 2/84, pp. 61-66.
Davis, "Fiber Optic Star Coupler . . . ", 31st Elect. Comp. Conf., 1981, Atlanta, Ga. (11-13, May 1981), pp. 382-386.
Bender, "Fiber Optic Data Bus Status . . . ", IFOC Handbook, 1980-80 Ed., pp. 57-61.
"Applications of Coherent Optical Communications in the Network Environment", Proc. SPIE, H. Kobrinski, vol. 568, pp. 42-49, San Diego, 1985.

Primary Examiner—William L. Sikes
Assistant Examiner—Brian M. Healy
Attorney, Agent, or Firm—James W. Falk

[57] ABSTRACT

A multiwavelength optical cross-connect network for a parallel processing computer system is disclosed. Illustratively, in a parallel processing computer system with N processors and M memories, two passive star couplers and a total of 2N+2M optical fiber links, produce a fully connected, internally non-blocking, large throughput, cross-connect network. Illustratively, the cross-connect network utilizes tunable optical sources and heterodyne receivers to deliver information requests from particular processors to particular memories and responses from particular memories to particular processors.

12 Claims, 2 Drawing Sheets

FAST OPTICAL CROSS-CONNECT FOR PARALLEL PROCESSING COMPUTERS

FIELD OF THE INVENTION

The present invention relates to parallel processing computers, and more particularly to a multiwavelength optical cross-connect system for parallel processing computers.

BACKGROUND OF THE INVENTION

The most straight forward and least expensive way to build a supercomputer capable of executing hundreds of millions of instructions per second is to interconnect a large number of microprocessors. Commercially available supercomputers do not use this approach, but rely on very fast components and pipelined operations. However, such machines are quite expensive, and each performance improvement is increasingly difficult to achieve. In contrast, the performance of machines comprising interconnected microprocessors can be significantly improved by providing more microprocessors, faster microprocessors, and better interconnections between them. Recent advances in very large scale integrated (VSLI) circuit technology have produced fast, inexpensive single chip microprocessors which may be utilized to form computer systems comprising large numbers of such processors. Such computers are generally known as parallel processing computers because numerous instructions are executed in parallel, i.e., at the same time.

A typical parallel processing computer system comprises a plurality of processors, a plurality of memories and a cross-connect system for interconnecting the processors and memories. The cross-connect system is used to enable simultaneous and exclusive connections between specific processors and specific memories and should permit any processor to send a request to any memory and any memory to send a response to any processor.

An important problem in the physical design of parallel processing computers is the design of the cross-connect system. One prior art electronic cross-connect system utilizes a mesh of bus-like backplane structures. This has the disadvantage that the number of interconnecting wires increases as the product of the number of processors, the number of memories, and the bus bit-width. Such a cross-connect system is limited to a relatively small number of processors because of the wiring limitations alone.

Othe prior art electronic cross-connect systems for interconnecting processors and memories in a parallel processing computer include a non-blocking crosspoint switch architecture and a Banyan-type packet communication network architecture. The crosspoint switch has the drawback of growing like $N^2$ for N processors. The Banyan-type structure has the drawback of a non-zero blocking probability and the drawback of an inherent processing delay while a path through the Banyan-type switching network is chosen. In general, electronic cross-connect systems require either parallel bus transmission or internal switches, and the large number of electrical wire connections seriously limits the maximum number of processors and the operational performance.

Optical networks have previously been implemented for interconnecting central offices in a telecommunications network. An example of such a network is disclosed in Cheung-Kobrinski-Loh U.S. patent application Ser. No. 948,244, abandoned, entitled "Multi-Wave Length Optical Telecommunication System", filed on Dec. 31, 1986 and assigned to the assignee hereof. The contents of this application are incorporated herein by reference. Each station or central office in the network of the above-described patent application comprises a transmitter capable of transmitting at a unique wavelength and a receiver. A hub element such as a passive star coupler is adapted to receive radiation at a different wavelength from each of the transmitters and transmit a fraction of the power received at each wavelength to all of the receivers. Thus, each central office receives a fraction of the power produced by each transmitter. The receiver at each central office is tunable to a specific wavelength so that simultaneous and exclusive connections can be established between particular central office pairs. Alternatively, the transmitters may be tunable and the receivers may be adapted to receive radiation of a fixed characteristic wavelength. Such optical networks have proven useful in overcoming some of the problems which arise in relation to the interconnection of central offices in a telecommunications network, including for example blocking problems, insufficient throughout problems, and physical design problems resulting from large numbers of wire cable connections.

Accordingly, efforts have been directed toward determining whether an optical system would be suitable for use as a cross-connect for a parallel computer. Thus, it is an object of the present invention to use passively coupled optical fibers and other optical components to provide an optical cross-connect for a parallel processing computer.

SUMMARY OF THE INVENTION

The present invention is an optical cross-connect for a parallel processing computer comprising N processors and M memories. Illustratively, the cross-connect system uses two separate optical sub-networks. The first sub-network is used for the transmission of requests from the processors to the memories and the second sub-network is used for the transmission of responses from the memories to the processors.

Each processor has a transmission node and a receiver node. Similarly, each memory has a tranmission node and a receiver node. The first optical sub-network includes a first optical star coupler and appropriate single mode optical fiber links for connecting the processor transmission nodes with the memory receiver nodes. This first optical sub-network enables any processor to send an information request to any memory. Illustratively, each memory receiver node is associated with a unique optical wavelength by way of a fixed heterodyne receiver or an optical band pass filter. Each processor transmission node has a tunable radiation source comprising one or more tunable laser diodes that cover the desired wavelength range.

The second optical sub-network includes a second star coupler and appropriate single mode optical fiber links for connecting the memory transmission nodes with the processor receiver nodes. This second optical sub-network enables any memory to send a response to any processor. Each processor receiving node is associated with a unique wavelength and each memory transmission node is wavelength tunable.

For transmission of a request from a specific processor to a specific memory, the specific processor tunes its transmission node to the unique optical wavelength of the receiving node in the specific memory. The request is encoded on the unique wavelength and transmitted via an optical fiber link to the first star coupler. The first star coupler transmits a fraction of the radiation carrying the request to all memory receiver nodes via optical fiber links. However, only the receiver node associated with the unique wavelength can detect the request. Similarly, when a specific memory responds to a request from a specific processor, its transmission node tunes to the unique wavelength of the receiver node of the specific processor. The response is encoded on the wavelength and transmitted via an optical fiber link to the second star coupler. The second star coupler transmits a fraction of the radiation carrying the response to all the processor receiver nodes. However, only the processor receiver tuned to the appropriate unique wavelength detects the request.

The multi-wavelength optical cross-connect system for parallel processing computers utilizes the enormous information carrying capacity of single mode optical fibers. The cross connect supports bit rates in the Gigabit per second range and average memory access times are on the order of 30 ns. In contrast to electronic cross-connects where the shear volume of wire connections poses a significant problem, only two optical fiber connections are made to each memory or processors. In addition, a very high level of concurrency is achievable using the inventive optical cross-connect. For example, if 128 processors are connected to 128 external memories, and each processor is addressing a different memory, then the maximum concurrency is obtained. The cross-connect of the present invention permits the maximum concurrency because there are no internal collisions in the cross-connect network itself. Thus, the inventive cross-connect supports as much parallelism as is required by any application. If, however, a memory is addressed by more than one processor, collisions external to the cross-connect can occur. Conflict resolution algorithms or protocols can be used to minimize such external collisions.

In short, the present invention is a multiwavelength optical cross-connect for a parallel processing computer. The inventive cross-connect permits the construction of parallel processing computers comprising between one hundred and one thousand processor and memory elements without stringent limitations due to the need for electrical interconnections between processors and memories.

DETAILED DESCRIPTION

Figure 1:
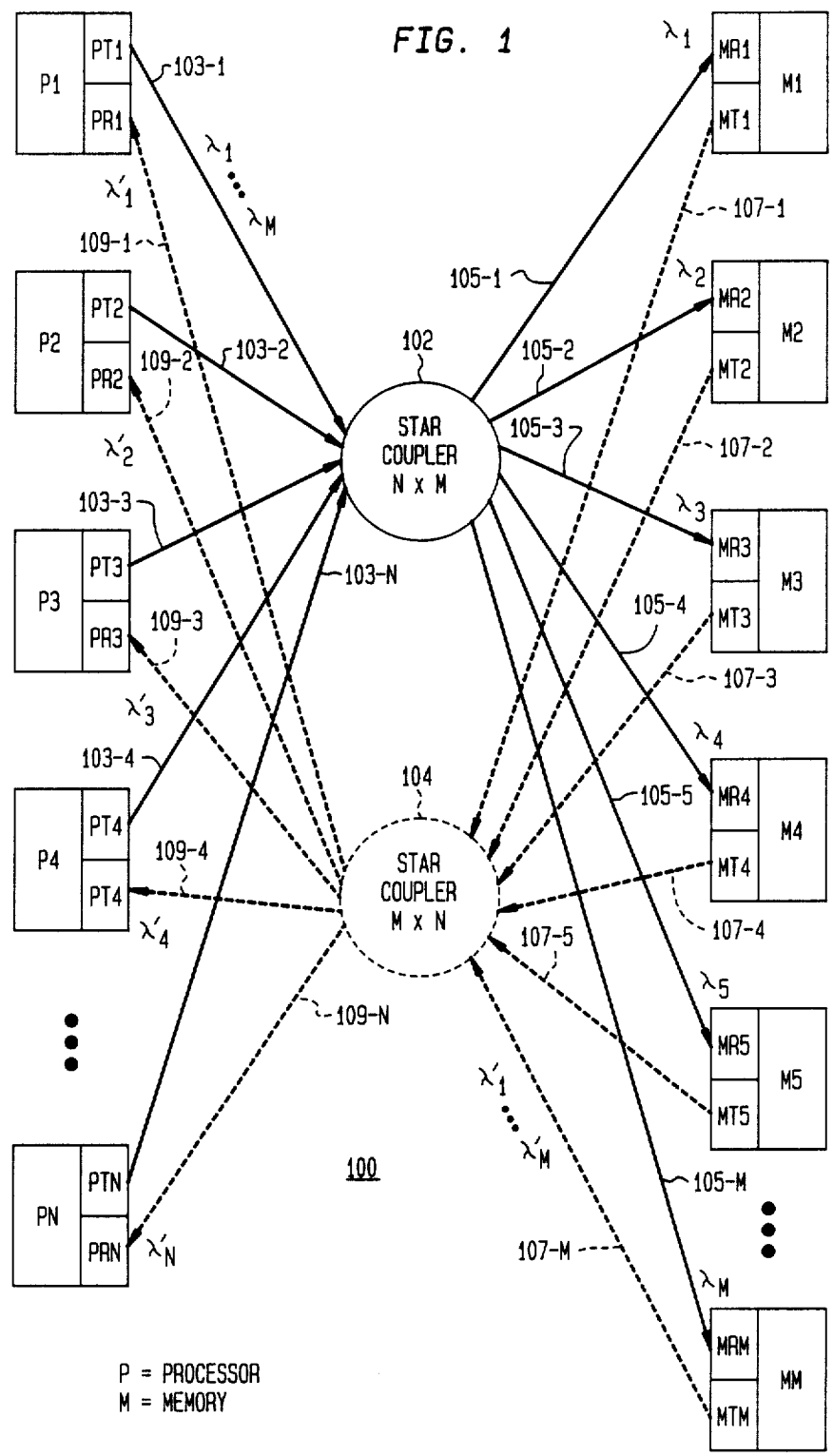
FIG. 1 is a schematic representation of a parallel processing computer system which utilizes a fast optical cross connect, in accordance with an illustrative embodiment of the invention.

Turning to FIG. 1, a parallel processing computer 100 is shown. The computer 100 includes N processors designated P1, P2, P3, P4,....PN. The computer also includes M memory units designated M1, M2, M3, M4, M5,....MM. Each processor P1, P2,...PN includes a transmitting node PT1, PT2,...PTN and a receiver node PR1, PR2,...PRN. The receiver node PR1, PR2,...PRN in each processor is adapted to detect information coded on a unique associated wavelength $\lambda_1'$, $\lambda_2'$,... $\lambda_N'$, respectively. The transmitting node PT1, PT2,...PTN in each processor is tunable. Similarly, each memory M1, M2,...MM comprises a wavelength tunable transmission node MT1, MT2,...MTM and a receiver node MR1, MR2,...MRM. The receiver node MR1, MR2,...MRM associated with each memory is adapted to detect information encoded on a unique associated wavelength $\lambda_1$, $\lambda_2$,... $\lambda_M$, respectively.

In the illustrative embodiment of the invention shown in FIG. 1, the cross-connect system used to interconnect the processors and memories comprises two all optical sub-networks. The first sub-network, shown with solid lines in FIG. 1, connects the transmission nodes PT1, PT2,...PTN in the processors with the receiver nodes MR1, MR2,...MRM in the memories. Thus, this sub-network is used by the processors to interrogate the memories. The first sub-network comprises optical fiber links 103-1, 103-2,...103-N, star coupler 102 and optical fiber links 105-1, 105-2,...105-M. The fiber links 103-1, 103-2,...103-N connect the transmission nodes of the processors with the star coupler 102. The fiber links 105-1, 105-2,...105-M connect the star coupler 102 with the receiver nodes of the memories. The coupler 102 is an N input, M output passive device. A fraction 1/M of the power received by the star coupler 102 on each of the N input fiber links 103 is transmitted out over each of the M output fiber links 105. Thus 1/M of the optical power from each procesor transmission node is transmitted to each memory receiver node. However, each memory receiver node MR1, MR2,...MRM can only detect information encoded on a unique associated wavelength, $\lambda_1$, $\lambda_2$,... $\lambda_M$, respectively. Accordingly, a specific processor can interrogate a specific memory by tuning its transmission node to the wavelength associated with the receiver node of the specific memory and encoding the interrogation information on this wavelength for transmission through the star coupler 102. Although the request will be transmitted by the star coupler to all memories, only the specific memory has a receiver node adapted to decode the interrogation information.

The second optical sub-network (shown in phantom lines in FIG. 1) connects the memory transmission nodes MT1, MT2,...MTM with the processor receiver nodes PR1, PR2,...PRN. Thus, the second sub-network is used by the memories to respond to requests from the processors. The second sub-network comprises optical fiber links 107-1, 107-2,...107-M, star coupler 104 and optical fiber links 109-1, 109-2,...109-N. The fiber links 107-1, 107-2,...107-M connect the M memory transmission nodes MT1, MT2,...MTM with the star coupler 104. The fiber links 109-1, 109-2,...109-N connect the star coupler 104 with the N processor receiver nodes PR1, PR2,...PRN.

The star coupler 104 is an M input, N output passive device. A fraction 1/N of the power received by the star coupler 104 on each of the M fiber input links 107 is transmitted out on each of the N output fiber links 109. Thus, 1/N of the power from each memory transmission node is transmitted to each processor receiver node. However, each processor receiver node can only detect information encoded on a unique associated wavelength $\lambda_1'$, $\lambda_2'$,... $\lambda_N'$. A specific memory can transmit a response to a specific processor by tuning its transmission node to the wavelength associated with the receiver node of the specific processor and encoding the response information on this wavelength for transmission through the star coupler 104. Although the response will be transmitted by the star coupler to all processors, only the specific processor will decode the response.

From FIG. 1, it can be seen that each processor and each memory requires only two optical fiber connections even though each processor can communicate with M different memories and each memory can communicate with N different processors. The set of wavelengths $\lambda_1'$, $\lambda_2'$,... $\lambda_M$ associated with the memory receiver nodes may overlap with the set of wavelengths $\lambda_1'$, $\lambda_2'$,... $\lambda_N$ associated with the processor receiver nodes. The reason for this (as seen in FIG. 1) is that the first set of wavelengths propagate in a first optical fiber sub-network while the second set of wavelengths propagates in a second optical fiber sub-network. Note, in an alternative embodiment of the invention, the memory receiver nodes and the processor receiver nodes are tunable over an appropriate wavelength range, while the memory transmission nodes and processor transmission nodes are adapted to transmit at a fixed characteristic wavelength. In another alternative embodiment of the invention, only a single optical fiber network comprising a single star coupler is used to interconnect the processors and memories. In this case, each of the receiver nodes MR1,...MRM, PR1,...PRN may be adapted to receive a unique wavelength $\lambda_1$, $\lambda_2$,... $\lambda_M$, $\lambda_{M+1}$,... $\lambda_{M+N}$, while the transmission nodes are tunable over the entire wavelength range. Alternatively, in such a single optical network embodiment of the invention, each of the transmission nodes MT1...MTM, PT1...PTN may be adapted to transmit at a unique characteristic wavelength and the receiver nodes MR1...MRM, PR1...PRN are tunable.

Figure 2:
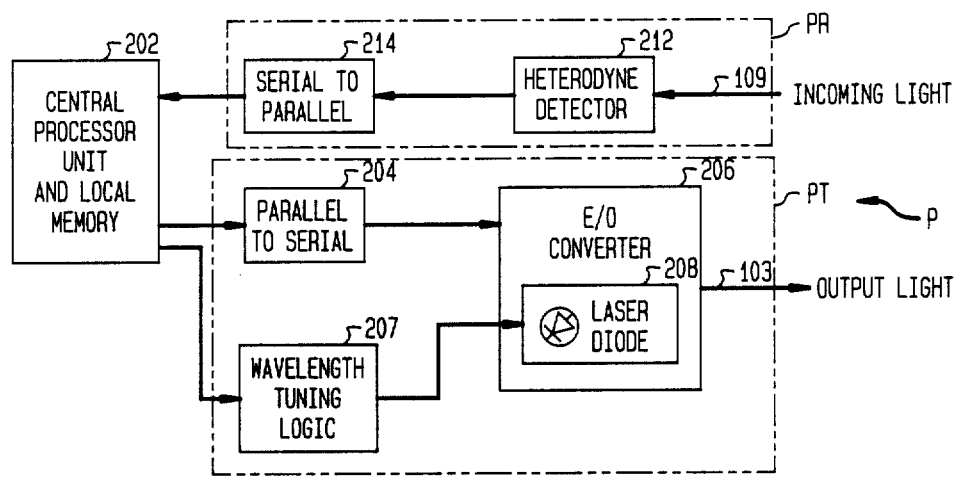
FIG. 2 is a block diagram of a processor for use in the computer system shown in FIG. 1.

FIG. 2 shows a block diagram of a processor P and its associated transmission node PT and receiver node PR. Typically, a processor P includes a central processing unit 202 with local memory. The central processing unit 202 can interrogate a specific one of the memories M1, M2,...MM by producing a digital signal which represents the inquiry and another signal to tune selectively a narrow line width wavelength tunable laser diode source. In the embodiment shown in FIG. 2, the central processing unit 202 produces an inquiry signal in parallel digital form which is converted to a serial digital signal in converter 204. The inquiry signal in serial digital form is coupled to electrical-to-optical converter and transmitter 206. The central processing unit 202 also produces a tuning signal which is coupled through tuning logic 207 to the tunable laser diode source 208 located in the electrical-to-optical converter and transmitter 206. The tuning signal tunes the laser diode 208 to a particular wavelength on which the inquiry is to be modulated to form an output signal. The modulated output signal is transmitted out of the processor P via the optical fiber 103 to the star coupler 102. The laser diode source 208 is preferably tunable at about the rate 1MHz between any two specific wavelengths over the entire tunable range of wavelengths. A suitable tunable laser is the cleaved coupled cavity laser. Other types of useful lasers may include distributed feedback or distributed Bragg reflector lasers. The modulated may be a LiNbO3 external modulator.

The receiver node PR of the processor P shown in FIG. 2 receives optical signals on optical fiber 109 and comprises a wavelength selective optical heterodyne detector 212 tuned to a characteristic assigned wavelength. Thus, while the fiber 109 carries radiation at a plurality of wavelengths $\lambda_1'$, $\lambda_2'$,... $\lambda_N'$ to the receiver information modulated on its associated wavelength. The heterodyne detector 212 outputs a serial digital electronic signal which is converted to a parallel digital signal in converter 214 and then transmitted into the central processor unit 202. An opticl heterodyne detector is discussed in detail in the above-identified Cheung-Kobrinski-Loh U.S. Patent Application incorporated herein by reference. Instead of utilizing heterodyne detection, each receiver node may include a narrow band pass filter such as a Fabry-Perot filer and a photodetector such as an avalanche photodiode detector.

Figure 3:
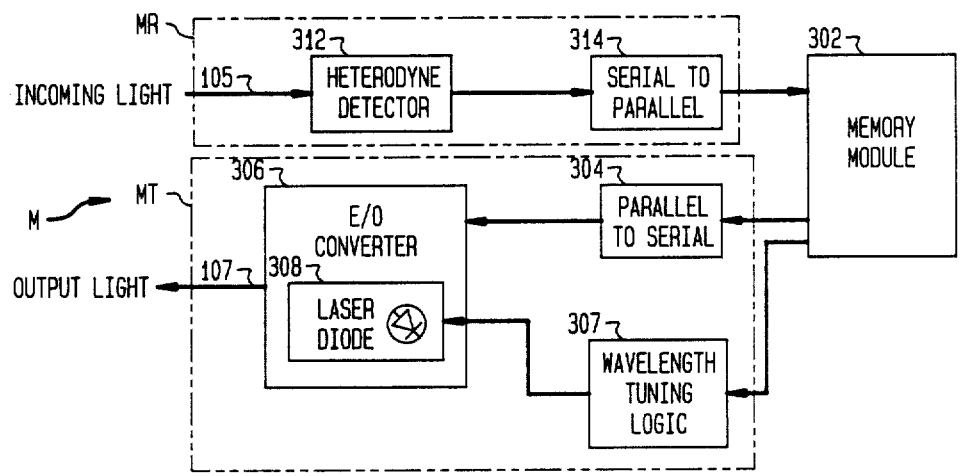
FIG. 3 is a block diagram of a memory for use in the computer system shown in FIG. 1.

FIG. 3 shows a block diagram of a memory unit M and its associated transmission node MT and receiver node MR. Typically, the memory unit M includes an electronic digital memory 302. The electronic memory 302 can respond to a request from a processor by producing a digital signal which represents the response and another signal to selectively tune a narrow linewidth wavelength tunable laser diode source.

In the embodiment shown in FIG. 3, the electronic memory 302 produces a response signal in parallel digital form. This response signal is converted from parallel to serial form in the parallel-to-serial converter 304 and transmitted to electric-to-optic converter and transmitter 306 wherein the response signal is converted from electrical to optical form. The electronic memory 302 also provides a signal which is transmitted to electric-to-optical converter via the wavelength tuning logic 307 to tune a tunable laser diode source 308 in the electric-to-optical converter and transmitter 306 to a particular wavelength associated with the receiver node in a desired processor. The response signal is then modulated on the particular wavelength for transmission to star coupler 104 via fiber link 107.

The receiver node MR comprises a wavelength selective heterodyne detector 312 which receives radiation at a number of wavelengths from star coupler 102 via fiber link 105 and detects request information modulated on the one of those wavelengths that is associated with memory M. The heterodyne detector 314 outputs a serial digital electronic signal which is converted from serial to parallel form in converter 314 and transmitted into the electronic memory 302. As indicated above a narrow band pass filter may be utilized instead of heterodyne detection.

As indicated above, in cross-connect networks two types of data collisions are possible. There are internal collisions due to collisions of information in the cross-connect itself and external collision resulting from the simultaneous arrival of data at particular receiver nodes. The optical cross connect described herein has no internal collisions and is totally internally non-blocking. External collisons can arise if two processors try to access the same memory at the same time. There are no external collisions resulting from two memories trying to send a response to the same processor at the same time. The reason is that a response from a memory to a processor follows a request to the memory from the processor, and processors generally do not direct simultaneous requests to several memories.

Steps can be taken to eliminate collisions resulting from several processors simultaneously directing a request to the same memory. For example a conventional time domain multiple access protocol can be used to insure that only one processor can attempt to access a memory at one time. In such a conventional protocol, the transmission nodes associated with the processors transmit at specific wavelengths associated with specific memory receiver nodes during specific subintervals within a master frame which is repeated over time. No two processors transmit at the same wavelength during the same subinterval. As a result, each memory can receive information from each processor without any possibility of a collision. The time domain multiple access protocol has the disadvantage of slowing the cross-connect system.

An alternative mechanism for avoiding collisions involves a reservation systems, so that memory access conflicts are arbitrated before transmission to insure that only one processor tunes to a given wavelength at a time.

In short, a multiwavelength optical cross-connect network for a parallel processing computer is disclosed. In a parallel processing computer with N processors and M memories, two passive couplers and a total of 2N+2M optical fiber links, produce a fully connected, internally non-blocking, large throughout cross-connect network. The cross-connect network permits the delivery of requests from specific processors to specific memories and the delivery of responses from specific memories to specific processors. Thus, the optical cross connect permits large numbers of processors and memories to be interconnected to form powerful computer systems without the limitations resulting from the need to provide electronic connections between the processors and memories.

Finally, the above-described embodiments of the invention are intended to be illustrative only. Numerous alternate embodiments made be devised by those skilled in the art without departing from the spirit and scope of the following claims.

What is claimed is:

1. A parallel processing computer system comprising:
    a set of processors and a set of memories, each of said processors and each of said memories comprising an optical transmission node and an optical receiver node,
    a first multiwavelength optical sub-network for interconnecting the transmission nodes of said processors and the receiver nodes of said memories to enable a plurality of said processors to simultaneously optically transmit access requests to a plurality of said memories utilizing a plurality of optical wavelengths, and
    a second multiwavelength optical sub-network for interconnecting the transmission nodes of the memories and the receiver nodes of the processors to enable a plurality of said memories to simultaneously transmit responses to access requests to a plurality of said processors utilizing a plurality of optical wavelengths.

2. The computer system of claim 1,
    wherein said first optical sub-network includes first optical means for passively transmitting at least a portion of the optical power from each processor transmission node to each memory receiving node, and
    wherein said computer system further includes means for selectively causing a specific processor transmission node and a specific memory receiving node to be tuned to the same wavelength at the same time.

3. The computer system of claim 2, wherein said first optical means comprises a passive star coupler.

4. The computer system of claim 3, wherein each processor transmission node includes a wavelength tunable source and each memeory receiving node is adapted to detect a characteristic optical wavelength.

5. The computer system of claim 4, wherein each memory receiving node includes a heterodyne detector.

6. The computer system of claim 1,
    wherein said second optical sub-network includes second optical means for passively transmitting at least a portion of the optical power from each memory transmission node to each processor receiving node, and
    wherein said computer system further includes means for selectively causing a specific memory transmission node and a specific processor receiving node to be tuned to the same wavelength at the same time.

7. The computer system of claim 6, wherein said second optical means comprises a passive star coupler.

8. The computer system of claim 7, wherein each memory transmission node includes a wavelength tunable source and each processor receiving node is adapted to detect a characteristic optical wavelength.

9. The computer system of claim 8, wherein each processor receiving node comprises a wavelength selective heterodyne detector.

10. The computer system of claim 1,
    wherein said first optical sub-network includes first optical means for passively transmitting at least a portion of the optical power from each processor transmission node to each memory receiver node, and
    said second optical sub-network includes second optical means for passively transmitting at least a portion of the optical power from each memory transmission node to each processor receiving node, and
    wherein said computer system further comprises
        means for causing a specific processor transmission node and a specific memory receiver node to be tuned to the same wavelength at the same time, and
        means for causing a specific memory transmission node and a specific processor receiving node to be tuned to the same wavelength at the same time.

11. The computer system of claim 1
    wherein each of said processor transmission nodes produces a distinct wavelength and each of said memory receiver nodes is wavelength tunable.

12. The computer system of claim 11 wherein each of said memory transmission nodes produces a distinct wavelength and each of said processor receiver nodes is wavelength tunable.

* * * * *

UNITED STATES PATENT AND TRADEMARK OFFICE
CERTIFICATE OF CORRECTION

PATENT NO. : 4,834,483

DATED : May 30, 1989

INVENTOR(S) : Arthurs et al.

It is certified that error appears in the above-identified patent and that said Letters Patent is hereby corrected as shown below:

Column 2, line 26, "throughout" should read --throughput--.
Column 3, line 29, "processors" should read --processor--.
Column 5, line 65, "modulated" should read --modulator--.
Column 6, line 14, "filer" should read --filter--.
Column 7, line 24, "throughout" should read --throughput--.
Column 8, line 12, "memeory", should read --memory--.
Column 7, line 36, "made be" should read --may be--.

Signed and Sealed this

Eleventh Day of August, 1992

*Attest:*

DOUGLAS B. COMER

*Attesting Officer*      *Acting Commissioner of Patents and Trademarks*